No. 703,550. Patented July 1, 1902.
C. S. CROW.
LOCK FOR WAGON END GATES.
(Application filed Dec. 7, 1901.)
(No Model.)
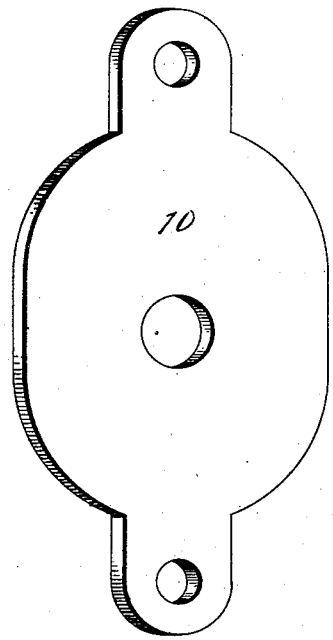
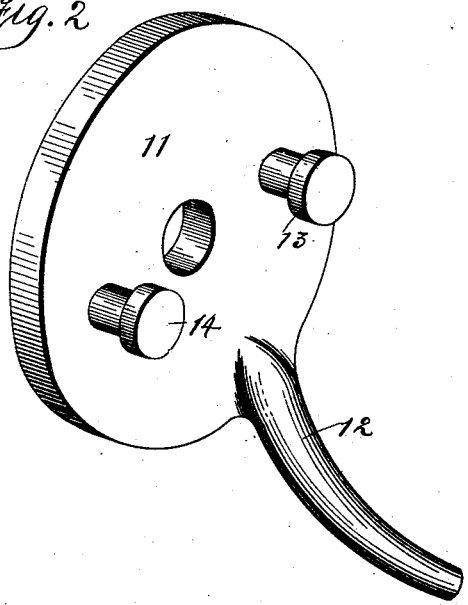
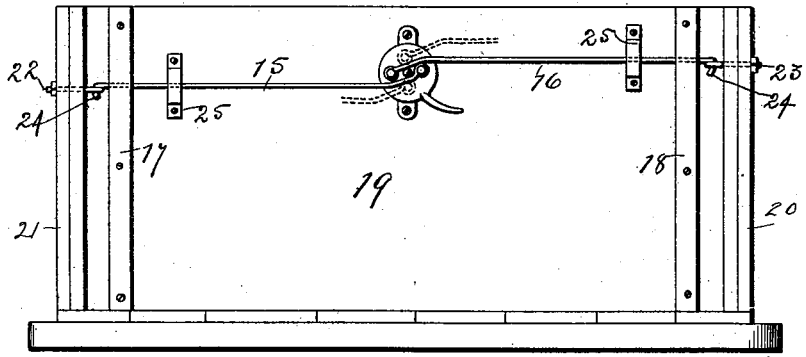
Witnesses: Inventor: Charles S. Crow
R. G. Orwig. By Thomas G. Orwig, Attorney.
L. H. Orwig.

UNITED STATES PATENT OFFICE.

CHARLES S. CROW, OF FRENDALE, IOWA.

LOCK FOR WAGON END-GATES.

SPECIFICATION forming part of Letters Patent No. 703,550, dated July 1, 1902.

Application filed December 7, 1901. Serial No. 85,059. (No model.)

*To all whom it may concern:*

Be it known that I, CHARLES S. CROW, a citizen of the United States, residing at Frendale, in the county of Johnson and State of Iowa, have invented a new and useful Lock for Wagon End-Gates, of which the following is a specification.

My object is to provide a simple, strong, and durable means for detachably fastening an end-gate of a wagon-box and to clamp the parallel sides of the box to the ends of the end-gate.

My invention consists in the construction, arrangement, and combination of clamping and locking devices with an end-gate and the sides of a wagon-box, as hereinafter set forth, pointed out in my claim, and illustrated in the accompanying drawings, in which—

Figure 1 is a perspective view of a plate adapted to be fixed to the outside face of an end-gate and pivotally connecting a clamping and locking device therewith. Fig. 2 is a perspective view of the clamping and locking device. Fig. 3 is an end view of a wagon-box, showing my invention applied as required for detachably and advantageously fastening the end-gate in the end of a wagon-box.

The numeral 10 designates a flat metal plate of oblong shape and provided with screw-holes in its end portions for fixing it to an end-gate, as shown in Fig. 3, by means of common screws or rivets. At its center is a bolt-hole, through which a rivet or screw-bolt can be extended for pivotally connecting the clamping and locking device therewith. A metal disk 11, having an integral extension 12, adapting it to be used as a lever, is provided with a central aperture for pivotally connecting it with the plate 10 by means of a rivet or bolt or in any suitable way, so it can be rotated on the plate 10. It is also provided with integral studs 13 and 14 on its outside face for pivotally connecting metal rods 15 and 16 therewith, and the rods are extended in opposite directions and through perforations in the cleats 17 and 18, fixed to the ends of an end-gate 19, to be detachably connected with the parallel side-boards 20 and 21 of a wagon-box. Eyebolts 22 and 23 are fixed in the side-boards, and the ends of the rods terminate in hooks 24, adapted to enter the eyebolts, as shown in Fig. 3.

Metal loops 25, through which the rods extend, are fixed to the end-gate to retain the rods in proper position on the end-gate.

To clamp the side-boards to the ends of the end-gate and to detachably connect the end-gate with the box and lock it securely, I simply turn the disk 11 a partial revolution, as required to bring the inner ends of the rods into parallel and overlying position, as shown in Fig. 3. The rods are thus shortened and draw the side-boards toward each other and tightly against the ends of the end-board and their inner ends past the dead-centers of the rotatable disk, so that force will have to be applied to the lever extension 12 for unlocking the end-gate. Dotted lines in Fig. 3 indicate the position of the operative parts when unlocked.

I am aware disks have been provided with handles and pivoted to a wagon end-gate and also provided with concentric slots for slidably connecting rods with the disks; but my manner of permanently pivoting rods to studs formed integral with the disk is greatly advantageous in that the rods are not required to change the positions of their pivoted ends relative to the disk when force is applied to rotate the disk.

Having thus described the construction, function, and arrangement and combination of the different parts, the practical operation and utility of my invention will be readily understood by persons familiar with the use of wagon end-gates, and

What I claim as new, and desire to secure by Letters Patent, is—

A lock for wagon end-gates comprising a metal plate fixed to the outside of the end-gate, a metal disk having an integral handle and integral studs, rods pivotally connected with the studs and terminating in hooks at their free ends and eyebolts fixed in the side-boards of a wagon-box, as shown and described to operate in the manner set forth for the purposes stated.

CHARLES S. CROW.

Witnesses:
MILO J. WHITTINGTON,
G. A. O'BRIEN.